United States Patent Office 2,765,648
Patented Oct. 9, 1956

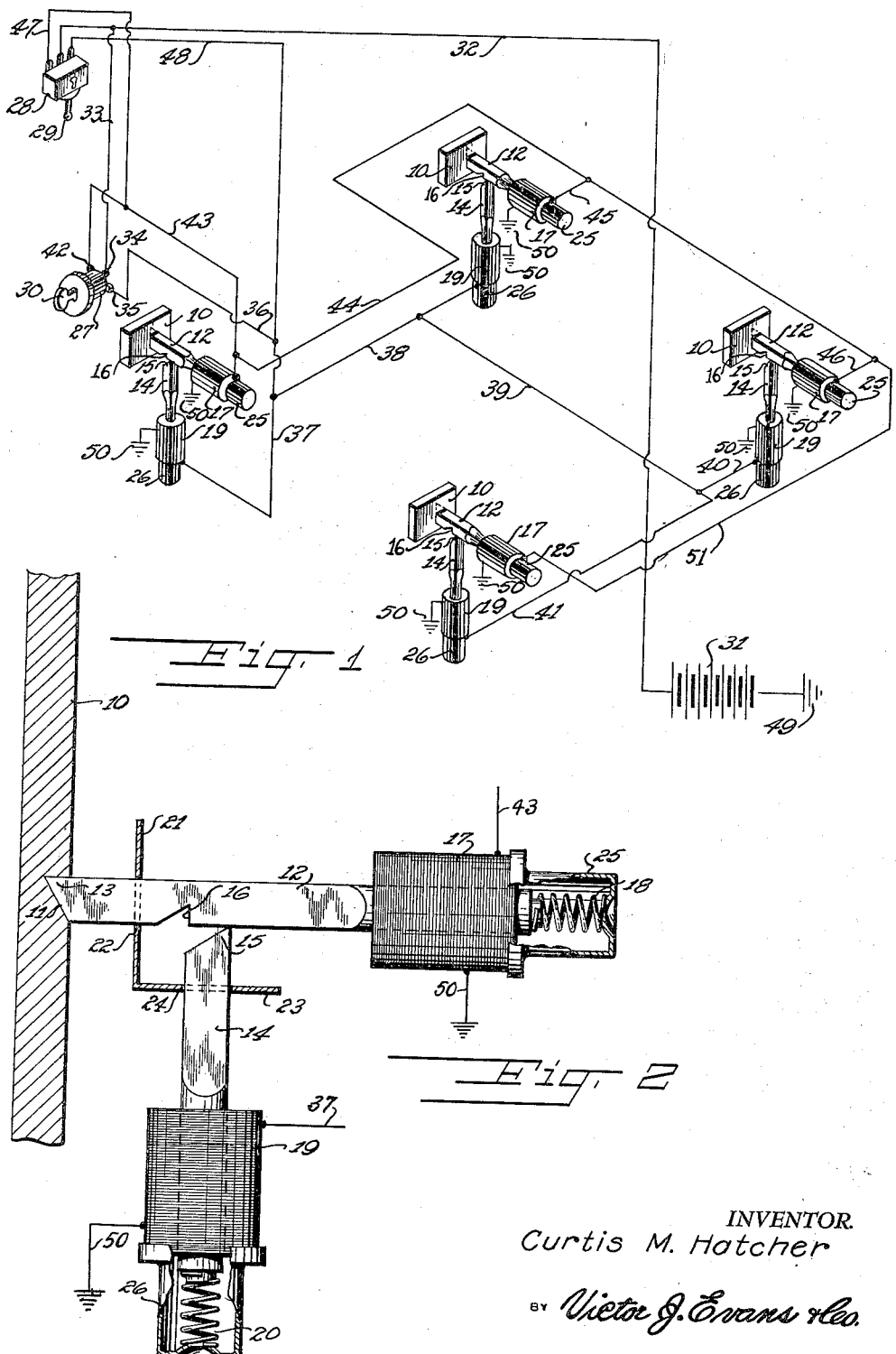

2,765,648

ELECTRO-MAGNETIC VEHICLE DOOR LOCK

Curtis M. Hatcher, Whittier, Calif.

Application March 13, 1953, Serial No. 342,061

2 Claims. (Cl. 70—264)

This invention relates to devices for automatically locking all of the doors or other parts of a motor vehicle or the like from a common point and wherein the locking elements may be locked or unlocked with a key from the outside of the vehicle, or with a button or lever on the inside of the vehicle.

The purpose of this invention is to provide means whereby upon locking or unlocking a door, window, or the like of a motor vehicle all other doors, windows or other parts of the vehicle are simultaneously locked or unlocked.

With the conventional type of motor vehicle door lock it is necessary to lock each door independently and in numerous instances one of the doors is overlooked, furthermore, particularly when children are positioned in the rear seat of a motor vehicle it is desirable to lock the doors from the instrument panel. With these thoughts in mind this invention contemplates locks or latches for doors or other parts of motor vehicles in which the lock bolts or latches are actuated by a solenoid and in which the solenoids of the latches are connected in a common circuit wherein with the circuit opened and closed by a key or hand lever the locks are simultaneously secured in open or closed positions.

The object of this invention is, therefore, to provide means for forming a motor vehicle lock whereby the lock may be connected in an electric circuit so that with a plurality of locks in the same circuit all locks are adapted to be simultaneously operated.

Another object of the invention is to provide solenoid locking and unlocking elements adapted to be incorporated in combination with doors of motor vehicles whereby all locks on a vehicle are simultaneously actuated and wherein the locks are adapted to be installed on motor vehicles without materially changing the design or arrangement of the conventional parts of the vehicle.

A further object of the invention is to provide a motor vehicle door and window locking system with which all windows and doors of a vehicle are locked or unlocked simultaneously from a common point, in which the locking elements are of a simple and economical construction.

With these and other objects and advantages in view the invention embodies a lock bolt having a notch therein, a solenoid actuated bar adapted to extend into the notch of the lock bolt for retaining the lock bolt in the locked position, a latch bar positioned to extend into a notch of the former bar, a solenoid for actuating the latch elements, a circuit connecting the solenoid to a source of current supply, a key actuated switch connected in the circuit and a manually actuated lever control switch also connected in the circuit.

Other features and advantages of the invention will appear from the following description taken in connection with the drawing, wherein:

Figure 1 illustrates a typical operative circuit illustrating the solenoid actuated latches or bars with key and lever actuated switches and with the latches positioned to lock bolts of the four doors of a vehicle in the locked position.

Figure 2 is a detail illustrating one of the latch combinations with the parts shown on an enlarged scale.

Referring now to the drawing wherein like reference characters denote corresponding parts the improved motor vehicle door lock of this invention includes a lock bolt 10 having a recess 11 therein, a locking bar 12 having a point 13 positioned to extend into the recess 11 of the lock bolt, a latch bar 14 having a point 15 positioned to extend into a recess 16 of the locking bar, a solenoid 17 for retracting the locking bar 12, a spring 18 for snapping the locking bar 12 to the locked position as shown in Fig. 1, a solenoid 19 for retracting the latch bar 14, and a spring 20 for snapping the latch bar 14 into locking position.

The assembly is provided with a guide having a flange 21 with an opening 22 therein for holding the locking bar 12 in operative position and a flange 23 having an opening 24 therein for retaining the latch bar 14 in operative position.

The solenoid 17 is also provided with a cap 25 providing a cover for the spring 18 and the solenoid 19 is provided with a similar cap 26 which provides a cover for the spring 20.

The latch assembly, as illustrated in Fig. 2, is installed whereby a locking bar 12 by the action of the spring 18 is adapted to snap into a notch in a lock bolt of each door of a vehicle, and the device may also be positioned whereby the lock assembly locks the windows in addition to the doors.

As illustrated in Fig. 1 the solenoids are connected to a key actuated switch 27 and also to a similar switch 28 that is actuated by a lever 29.

The switch 27 is actuated by a key 30 which, when turned in one direction completes a circuit from a battery 31 through wires 32 and 33 to a terminal 34 and from a terminal 35 through wires 36, 37, 38, 39, 40 and 41 to the solenoids 19, whereby the latch bolts 14 are withdrawn and as the latch bars are withdrawn the springs 18 will snap the locking bars 12 into the notch 11 of the lock bolts 10 of the doors.

The latch bar 14, as shown in Fig. 2, is inactive when the locking bar 12 is in locked position. When the solenoid 17 retracts the locking bar 12, the point 15 of the latch bar 14 extends into the recess 16 in the locking bar 12. In this position the latch bar 14 retains the locking bar 12 in unlocked position. Since it is the action of the spring 18 that snaps the locking bar 12 into locked position when the solenoid 17 is de-energized, it is necessary that some means be provided to retain the locking bar 12 in unlocked position. Thus, the latch bar 14 retains the locking bar 12 in unlocked position.

By turning the key 30 in the opposite direction or counter clockwise the circuit is completed from the battery to the terminal 34 and from a terminal 42 through wires 43, 44, 45, 46 and 51 to the solenoids 17 whereby the locking bolts 12 are moved out of the notches 11 of the lock bolts 10.

By the same means the lock bolt is locked and relieved from the inside of the vehicle by moving the lever 29 from one side to the other whereby circuits are completed through the wires 47 and 48 to the solenoids 17, and 19, respectively.

The battery 31 is connected to a ground 49 and the solenoids are connected to grounds as indicated by numeral 50.

By this means each door of a vehicle may be locked with a key in a lock at a common point, such as the lock or switch 27, so that it is not necessary to lock each door. By this same means the doors are simultaneously released, and by the lock or switch 28 the doors are locked or released from the inside of the vehicle.

It will be understood that although the latching elements are illustrated and described as particularly adapted for locking doors of a motor vehicle, they may also be used for locking windows and doors for other purposes.

It will be understood that modifications, within the scope of the appended claims, may be made in the design and arrangement of the parts without departing from the spirit of the invention.

What is claimed is:

1. In a motor vehicle door lock, the combination which comprises a lock bolt for use in a motor vehicle and adapted to be positioned for locking a door in the vehicle, said lock bolt having a notch therein, a locking bar positioned whereby an end thereof extends into the notch of the lock bolt, said locking bar having a notch therein, a latch bar positioned whereby an end thereof extends into the notch of the locking bar for retaining said locking bar in unlocked position, solenoids for retracting the locking bar to the position of unlocking the lock bolt and also for withdrawing the latch bar from the locking bar, and springs for actuating the locking bar to lock the lock bolt and for urging the latch bar into the notch of the locking bar.

2. In a motor vehicle lock, the combination which comprises a lock bolt for use in combination with a door of a motor vehicle, a locking bar positioned to retain the lock bolt in the locking position, a solenoid for retracting the locking bar in the position of unlocking the lock bolt, a spring for snapping the locking bar to a position for holding the lock bolt in the locking position, a latch bar positioned to retain the locking bar in a position of unlocking the lock bolt, a spring for urging the latch bar to locking relation with the locking bar, a solenoid for retracting the latch bar from the position of retaining the locking bar in the unlocked position, a guide in which the locking and latch bars are slidably mounted, a circuit connecting the solenoids of the locking and latch bars to a source of current supply, a key operated switch in said circuit for, selectively, completing circuits to each of the solenoids, and a lever actuated switch in said circuit also for, selectively, completing circuits to each of said solenoids.

References Cited in the file of this patent

UNITED STATES PATENTS

| 1,833,572 | Hardesty | Nov. 24, 1931 |
| 1,864,474 | Rosenbaum | June 21, 1932 |
| 1,920,080 | Jenkins | July 25, 1933 |
| 2,028,852 | Vincent | Jan. 28, 1936 |